United States Patent [19]

Hahn et al.

[11] Patent Number: 5,193,457

[45] Date of Patent: Mar. 16, 1993

[54] PROCESS FOR PRINTING ON A GLASS SHEET WITH A DECORATIVE FRAME

[75] Inventors: Dieter Hahn, Uebach; Manfred Boerger, Aachen-Kornelimuenster, both of Fed. Rep. of Germany

[73] Assignee: Saint-Gobain Vitrage International, Courbevoie, France

[21] Appl. No.: 715,765

[22] Filed: Jun. 14, 1991

[30] Foreign Application Priority Data

Jun. 30, 1990 [DE] Fed. Rep. of Germany ....... 4020972

[51] Int. Cl.$^5$ ..................... B41M 1/12; B41F 15/00
[52] U.S. Cl. ..................... 101/129; 101/127; 101/127.1; 101/128.21; 427/282
[58] Field of Search ............... 101/129, 127, 127.1, 101/128.21; 118/213; 427/282, 284, 287

[56] References Cited

U.S. PATENT DOCUMENTS

| | | | |
|---|---|---|---|
| 789,949 | 5/1905 | Wixcel | 101/114 |
| 1,590,380 | 6/1926 | Keel | 101/129 X |
| 2,532,802 | 12/1950 | Farwell | 101/114 X |
| 3,056,696 | 10/1962 | Browne | 427/287 X |
| 4,246,866 | 1/1981 | Hopings | 101/126 X |
| 4,268,545 | 5/1981 | Hodulik | 427/282 |
| 4,300,933 | 11/1981 | Thomas | 101/129 X |
| 4,300,934 | 11/1981 | DeTerre | 101/129 X |
| 4,407,847 | 10/1983 | Boaz | 427/35 |
| 4,586,433 | 5/1986 | Jaffa | 101/123 |

OTHER PUBLICATIONS

Screen Process Printing, Albert Kosloff, Sign of the Times Publishing Co., p. 36, Cincinnati, 1950.

Primary Examiner—Edgar S. Burr
Assistant Examiner—Eric P. Raciti
Attorney, Agent, or Firm—Oblon, Spivak, McClelland, Maier & Neustadt

[57] ABSTRACT

To print on a glass sheet (42) with an edge-flush peripheral decorative frame (43, 45) the printing of decorative frame (43, 45) takes place with a silk-screen printing process in two printing operations, in which two partial areas (43, 53) of decorative frame (45) complementary to each other are printed consecutively. In the first printing operation a first partial area (43) of decorative frame (45) is aligned along two adjacent edges flush with corresponding glass sheet edges (46, 47), and in the second printing operation a second partial area (53) of decorative frame (45) is aligned edge-flush with the two other glass sheet edges (48, 49). The two partial areas (43, 53) of the decorative frame complementary to each other mutually overlap by measurement (D), which corresponds to the area tolerances of the glass sheets.

5 Claims, 4 Drawing Sheets

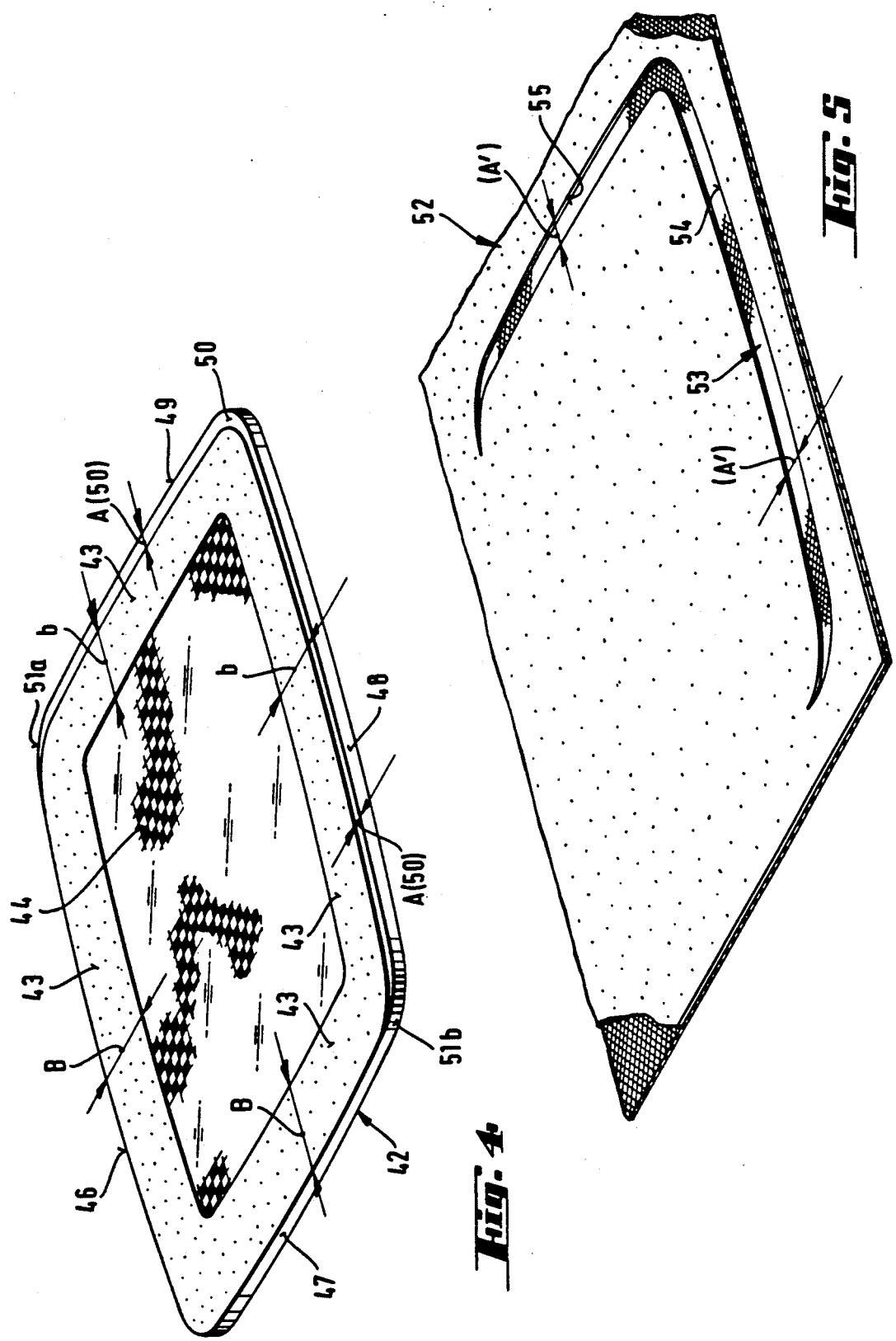

PROCESS FOR PRINTING ON A GLASS SHEET WITH A DECORATIVE FRAME

BACKGROUND OF THE INVENTION

1. Field of the Invention

The invention relates to a process for printing on a glass sheet, via a silk-screen printing technique, with a decoration having a framelike closed form.

2. Description of the Background

To a great extent, auto glass sheets are provided with a framelike baked opaque layer. A printing ink is applied to the glass surface via the silk-screen printing process and baked at temperatures of 550 to 600 degrees Celsius or more. Auto glass sheets, which are cemented to the auto body, are typically provided with such decorative frames. Glass sheets intended for glass roofs are also usually provided with such decorative frames, and the region of the glass roof sheets inside this decorative frame is generally provided with a grid decoration to reduce the radiative heat transmission. The grid is applied in the same printing operation as the decorative frame.

Often the installed glass sheets are not covered by a profile frame bordering the glass sheet on the edge or overlapping the edge. Instead, the edges of but the glass sheets are visible from the outside. This means that the framelike decorative printing is also visible up to the peripheral edge of the glass sheet. Irregularities in the outside boundary of the decorative frame, especially slightly different distances of the outside boundary of the decorative frame from the glass sheet edge, are very obvious. Therefore there is a considerable interest in printing the ink layer forming the decorative frame along the entire sheet periphery with a constant distance from the edge of the glass sheet or preferably directly up to the peripheral edge of the glass sheet.

But in practice it is extremely difficult to perform an exact printing to the edge of the glass sheet with a silk-screen printing process. The silk-screen printing process has to be done so that the printing area of the silk-screen printing stencil does not project over the edge of the glass sheet. Otherwise, both the edge of the glass sheet and the underside of the silk-screen printing stencil become dirty from the printing ink so that the glass sheets and/or the silk-screen printing stencils become unusable. To produce a clean silk-screen printing to the edge of the glass sheet, the outside contour of the glass sheets, i.e., their shape and size, has to correspond exactly to the outside contour of the printing area of the silk-screen printing stencil. With current production methods for glass sheets, this condition cannot be adequately maintained since the methods used for cutting and grinding of the glass sheets necessarily lead to area tolerances, which in each of the two planar dimensions of the sheet area can amount to about 1.5 mm. For this reason, it is not possible to perform the desired area-accurate printing up to the glass edge with the known silk-screen printing technique.

SUMMARY OF THE INVENTION

An object of the invention is to provide a process for printing on glass sheets with a silk-screen printing process so that, independently of the area tolerances of the glass sheets, the printed decorative frame along the entire periphery of the glass sheet reaches fully to the peripheral edge of the glass sheet.

According to the invention this object is achieved by forming at least two partial areas of the decoration complementary to each other in at least two consecutive printing operations. The first partial area is aligned along at least one edge edge-flush to the corresponding first glass sheet edge, and the other partial areas are aligned along at least one edge edge-flush to another glass sheet edge. The partial areas of the decoration complementary to each other mutually overlap at least by the measurement of the area tolerances of the glass sheets.

Thus according to the process of the invention, a silk-screen printing operation takes place, for example, in two consecutive steps with two different silk-screen printing stencils. The printing layouts on the two silk-screen printing stencils in this case are configured so that, for example with a glass sheet with four side edges, at each printing operation the printing pattern ends along two adjacent side edges at such a distance from these side edges that even with a glass sheet which exhibit the smallest dimensions within the tolerance range, an edge strip along these two side edges of the glass sheet remains free of the printing ink. In this way, in the first printing operation no dirtying of the printing screen and/or of the glass sheet edges can take place along these two glass sheet edges.

In the first printing operation the application of the printing ink takes place along two edges up to the glass sheet edges. This is generally possible without any difficulties, since the glass sheet to be printed on and the silk-screen printing stencil can be positioned along two adjacent edges with relatively great precision. Correspondingly, a second printing operation follows in which either the position of the glass sheet or the position of the second silk-screen printing stencil, or optionally the position both of the glass sheet and the silk-screen printing stencil, is selected or changed so that now the two other glass sheet edges coincide with the outside boundary lines of the printing area. The generally unavoidable tolerances in the area dimensions of the glass sheets in this procedure manifest themselves only in the degree of overlapping of the two partial decorative areas, possibly being different from glass sheet to glass sheet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 shows the glass sheet of FIG. 3 after printing the first partial decoration, and FIG. 5 shows a cutout of the silk-screen printing stencil for the second partial decoration for the glass sheet of FIG. 3.

DESCRIPTION OF THE PREFERRED EMBODIMENTS

Figure 1:
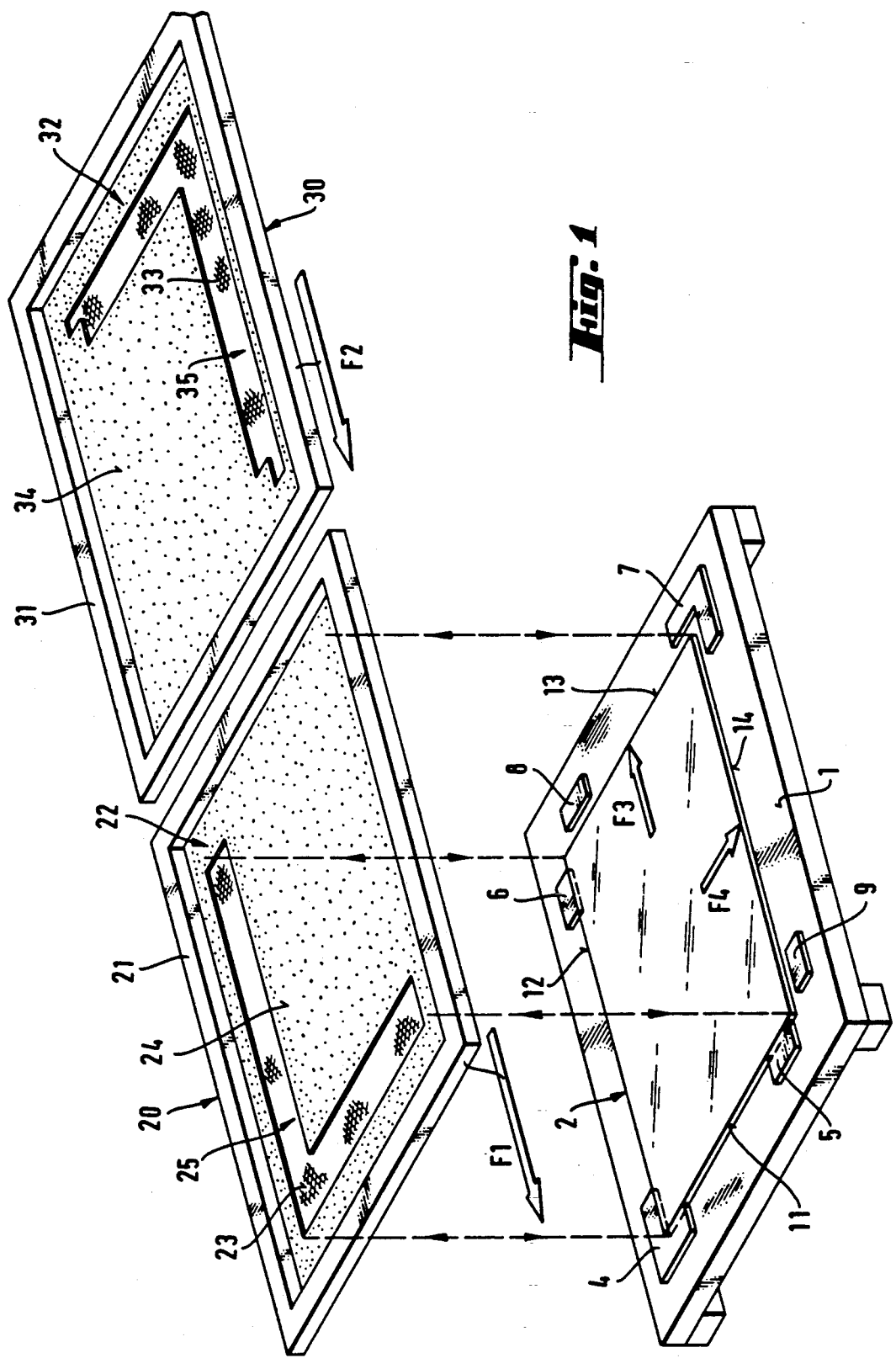
FIG. 1 shows the basic design of a device suitable for performing the process according to the invention.

As can be seen in FIG. 1, the silk-screen printing device for performing the process according to the invention comprises a supporting table 1 for supporting and positioning glass sheet 2, a first form 20 and a second form 30. Forms 20 and 30 are mounted to slide in the usual way above supporting table 1 on guide rails, not shown, and so can be positioned relative to supporting table 1.

Various stops 4 to 9, which serve for positioning glass sheet 2, are placed on supporting table 1. Stops 4, 5 and 6 serve for establishing the position of edges 11 and 12 of glass sheet 2 on supporting table 1. Stops 7, 8 and 9 have the task of determining the position of edges 13 and 14 on supporting table 1. Stops 4, 5, 6, on the one hand, and 7, 8, 9, on the other hand, describe an area which is greater than the area of glass sheet 2, so that glass sheet 2 either rests on stops 4, 5 and 6 and occupies its first position or rests on stops 7, 8 and 9 and occupies its second position.

In the first position, which is shown in FIG. 1, glass sheet 2 is printed-on via form 20. Form 20 encompasses stencil frame 21 and stencil 22, which is formed by silk-screen printing fabric 23 and stencil film 24. Silk-screen printing fabric 23, not covered by stencil film 24, forms first partial area 25 of the decorative layer to be printed. When with the use of form 20, the first partial area of the decorative layer is printed on glass sheet 2, form 20 is laterally moved from the area of supporting table 1 in the direction of arrow $F_1$, and form 30 is moved into printing position in the direction of arrow $F_2$.

Glass sheet 2 is now moved in the direction of arrows $F_3$ and $F_4$ until edges 13 and 14 rest on stops 7, 8 and 9 and in this way glass sheet 2 occupies its second position for the printing application of the second partial area. When the printing ink printed on in the first process step has dried, which optionally can take place in a separate drying station, the second partial area is printed on with the use of form 30. Form 30 again exhibits a stencil frame 31 and a stencil 32, which consists of silk-screen printing fabric 33 and film 34 covering silk-screen printing fabric 33, and forms partial area 35 of the decorative layer to be printed. Form 30 is transferred above supporting table 1 and positioned there. The second printing operation is then performed.

Figure 2:
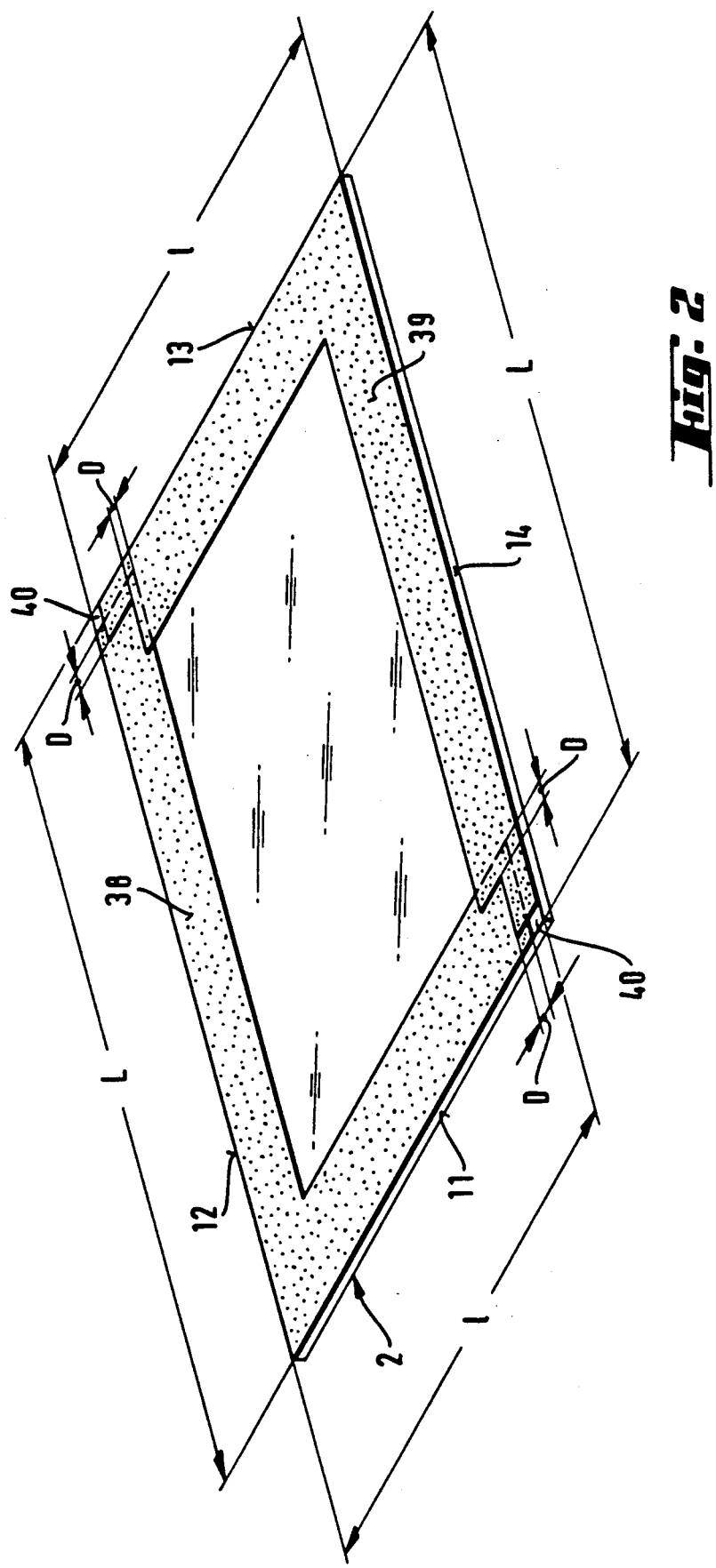
FIG. 2 shows an embodiment of a printed-on, rectangular glass sheet provided with a framelike decorative print.

As shown in FIG. 2, after the second printing operation, the two partial decorative areas 38 and 39 form a closed decorative frame. The lengths of partial decorative areas 38 and 39 are slightly shorter that the corresponding edge lengths L and l of the smallest glass sheets to be printed on. Measurement D of the overlapping of the two partial decorative areas corresponds to the tolerance width of the sheet dimensions and preferably is somewhat greater. In two corners of glass sheet 1 small corner areas 40 remain, whose area size is a few square millimeters and which remain free of printing ink following the two silk-screen printing operations. Printing ink can then be applied by hand or other means to corner areas 40, if continuous coating up to the edge is desired also in these areas.

Figure 3:
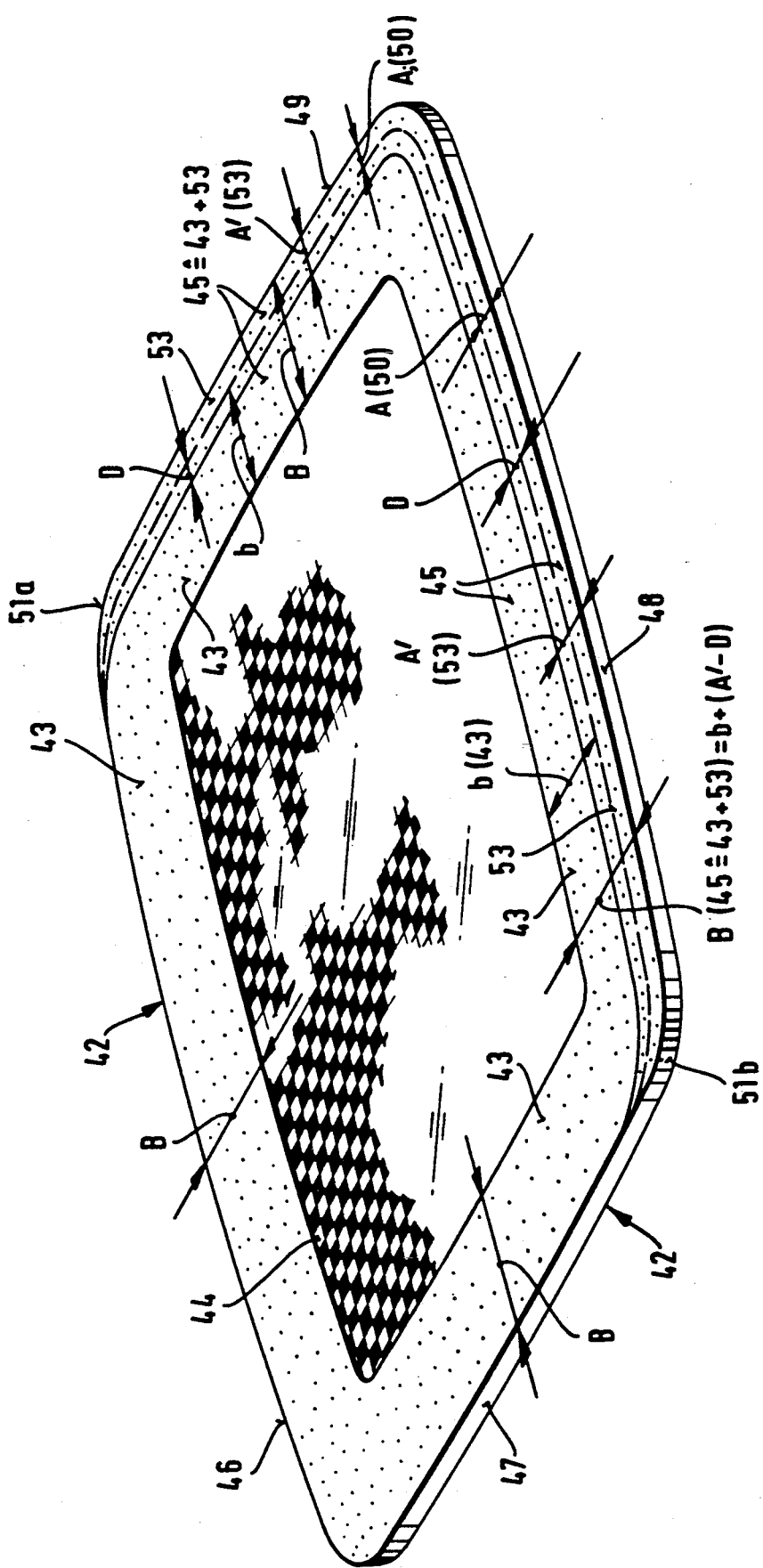
FIG. 3 shows an embodiment of a printed-on glass sheet according to the invention with a framelike decorative print and a gridlike decorative print within the frame.

FIG. 3 shows a glass sheet 42 with rounded corners, which is used as glass roof sheet for motor vehicles and has a closed decorative frame 43, 45 along its periphery and a grid decoration 44 within decorative frame 43. Grid decoration 44 serves to reduce energy transmission, is also applied like decorative frame 43, according to the silk-screen printing process and is baked at high temperature.

Such a glass sheet can also be successfully produced according to the process of the invention. For this purpose, glass sheet 42 is again printed on in two process steps. In the first process step glass sheet 42 is provided with a partial decorative frame 43, as shown in FIG. 4. Partial decorative frame 43 has a final width B along longitudinal side 46 and along crosswise side 47 but, in contrast, has a small width b along longitudinal side 48 and along crosswise side 49 so that partial decorative frame 43 along sides 48 and 49 ends at distance A from the glass edges. Grid field 44 is also printed in the first process step. After the first process step glass sheet 42 is already provided with the complete decoration except for a narrow edge strip 50 along the two sides 48 and 49. Edge strip 50, left free, extends up to over the areas of rounded corners 51a and 51b, where it is tapered in each case.

In the second process step, edge strip 50, left free, is printed on with the help of a silk-screen printing stencil 52, as shown in section in FIG. 5. Printing area 53 corresponds to the form of edge strip 50 but, for the formation of an overlap D, exhibits a greater width A'. Silk-screen printing stencil 52 and glass sheet 42 are aligned with one another before the printing operation so that outside boundary lines 54 and 55 of printing area 53 coincide with corresponding edges 48 and 49 of glass sheet 42. Once the second printing operation has been performed, decorative frame 43, 35 with full width B has been produced continuously and flush to the sheet edges.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. Process for silk screen printing a closed border around the peripheral edges of a sheet of automotive glass, comprising the steps of:
   a. providing a multi-side sheet of automotive glass;
   b. providing a first stencil shaped to accommodate at least one side of the sheet of glass up to the peripheral edge thereof;
   c. silk screening a first narrow printed area along at least one side of the sheet of glass up to the peripheral edge thereof with said first stencil;
   d. providing at least one other stencil to accommodate at least one side of the sheet of glass up to the peripheral edge thereof, wherein said at least one other stencil at least partially overlaps the first narrow printed area;
   e. silk screening at least one other narrow printed area along at least one remaining side of the sheet of glass up to the peripheral edge thereof with said at least one other stencil; and
   f. repeating steps d and e above until all sides of the glass sheet are silk screened.

2. Process of claim 1, wherein:
   the multi-sided sheet of automotive glass provided in step a is a four-sided sheet of automotive glass having opposite corners; and
   the first stencil provided in step b is a substantially L-shaped stencil configured to accommodate two adjacent sides of the sheet of glass up to the peripheral edges thereof;

the at least one other stencil provided in step d is a single, substantially L-shaped stencil to accommodate the two remaining adjacent sides of the sheet of glass up to the peripheral edges thereof, wherein the other stencil at least partially overlaps the first narrow printed area at the opposite corners of the glass sheet.

3. Process of claim 1, wherein:

the multi-sided sheet of automotive glass provided in step a is a four-sided sheet of automotive glass having opposite corners; and the first stencil provided in step b is a substantially U-shaped stencil configured to accommodate three adjacent sides of the sheet of glass up to the peripheral edges thereof;

the at least one other stencil provided in step d is a single stencil to accommodate the remaining adjacent side of the sheet of glass up to the peripheral edge thereof, wherein the other stencil at least partially overlaps the first narrow printed area.

4. Process of claim 1, wherein steps a-f are performed repeatedly with successive glass sheets, and the step of providing at least one other stencil further comprises the step of assuring that the overlap between the other stencil and the first narrow printed area overlap by an area equal to the area tolerances between successive glass sheets.

5. Process of claim 1, further comprising the step of moving the glass sheet between steps c and d.

* * * * *